(12) United States Patent
Caldwell et al.

(10) Patent No.: US 11,538,005 B2
(45) Date of Patent: Dec. 27, 2022

(54) LONG STRING PATTERN MATCHING OF AGGREGATED ACCOUNT DATA

(71) Applicant: MX TECHNOLOGIES, INC., Lehi, UT (US)

(72) Inventors: John Ryan Caldwell, Provo, UT (US); Brandon Dewitt, Provo, UT (US); Brian Stien, Provo, UT (US)

(73) Assignee: MX TECHNOLOGIES, INC., Lehi, UT (US)

( * ) Notice: Subject to any disclaimer, the term of this patent is extended or adjusted under 35 U.S.C. 154(b) by 1877 days.

(21) Appl. No.: 14/572,737

(22) Filed: Dec. 16, 2014

(65) Prior Publication Data

US 2015/0206109 A1  Jul. 23, 2015

Related U.S. Application Data (60) Provisional application No. 61/916,703, filed on Dec. 16, 2013.

(51) Int. Cl.
| | | |
|---|---|---|
| *G06Q 20/10* | (2012.01) | |
| *G06F 16/24* | (2019.01) | |
| *G06Q 30/02* | (2012.01) | |

(52) U.S. Cl.
CPC ............ *G06Q 20/10* (2013.01); *G06F 16/24* (2019.01); *G06Q 30/02* (2013.01); *G06Q 30/0255* (2013.01)

(58) Field of Classification Search
CPC .... G06Q 20/10; G06Q 30/02; G06Q 30/0255; G06F 16/24
USPC .......................................................... 705/50
See application file for complete search history.

(56) References Cited

U.S. PATENT DOCUMENTS

| | | | | |
|---|---|---|---|---|
| 7,634,657 | B1 * | 12/2009 | Stringham | ............ H04L 9/0643 380/251 |
| 3,041,074 | A1 | 10/2011 | Rhoads et al. | |
| 8,041,074 | B2 * | 10/2011 | Rhoads | ............ G06K 19/06037 382/100 |
| 8,170,897 | B1 * | 5/2012 | Cohen | .............. G06Q 10/06311 705/7.13 |
| 2003/0218927 | A1 * | 11/2003 | Mayer | .................... B82Y 10/00 365/200 |

(Continued)

FOREIGN PATENT DOCUMENTS

AU    2014364942 A1    7/2016

OTHER PUBLICATIONS

European Patent Application No. 14872568.2 Extended European Search Report dated May 16, 2017.

(Continued)

*Primary Examiner* — Mohammad A. Nilforoush
*Assistant Examiner* — Cristina Owen Sherr
(74) *Attorney, Agent, or Firm* — Kunzler Bean & Adamson (57) ABSTRACT

The disclosure extends to methods, systems, and computer program products for identifying transaction data from within aggregated data and suggesting additional services based on the transaction data. The disclosure also extends to methods, systems, and computer based products for discovering transaction attributes within a database of aggregated account data including, aggregating and matching financial account attributes between a plurality of accounts in order to provide additional services to account holders.

23 Claims, 5 Drawing Sheets

(56) References Cited

U.S. PATENT DOCUMENTS

| | | | |
|---|---|---|---|
| 2005/0137969 A1* | 6/2005 | Shah | G06Q 20/10 |
| | | | 705/39 |
| 2005/0187867 A1 | 8/2005 | Sokolic et al. | |
| 2006/0212426 A1* | 9/2006 | Shakara | H04L 63/145 |
| 2007/0112777 A1* | 5/2007 | Field | G06F 16/9537 |
| 2008/0077582 A1 | 3/2008 | Reed | |
| 2008/0156866 A1* | 7/2008 | McNeal | G06V 40/12 |
| | | | 235/379 |
| 2008/0162396 A1 | 7/2008 | Kerley et al. | |
| 2008/0189772 A1* | 8/2008 | Sims | G06F 21/445 |
| | | | 726/5 |
| 2009/0022413 A1* | 1/2009 | Singh | H03M 7/30 |
| | | | 382/244 |
| 2009/0172259 A1* | 7/2009 | Prins | G06F 3/0679 |
| | | | 711/103 |
| 2009/0183159 A1* | 7/2009 | Michael | G06F 9/467 |
| | | | 718/101 |
| 2010/0293196 A1 | 11/2010 | Roy et al. | |
| 2010/0312799 A1 | 12/2010 | Harush | |
| 2011/0083064 A1 | 4/2011 | Kagan et al. | |
| 2011/0106936 A1 | 5/2011 | Galbreath et al. | |
| 2011/0185405 A1* | 7/2011 | Ganesan | H04L 63/18 |
| | | | 726/6 |
| 2011/0188404 A1* | 8/2011 | Dong | H04L 12/28 |
| | | | 370/254 |
| 2012/0131572 A1 | 5/2012 | Shae et al. | |
| 2013/0326055 A1 | 12/2013 | Chatterjee et al. | |

OTHER PUBLICATIONS

Anonymous, "Bloom filter—Wikipedia", Dec. 12, 2013, https://en.wikipedia.org/w/index.php?title=Bloom_filter&oldid=585692727, Retrieved on Apr. 20, 2017.

European Patent Application No. 14872568.2 Exam Report dated Nov. 30, 2018.

European Patent Application No. 14872568.2 Supplementary European search report dated Jun. 2, 2017.

Canadian Patent Application No. 2,934,280 Office Action dated Jan. 8, 2018.

PCT International Application No. PCT/US14/70685 International Search Report and Written Opinion dated Apr. 28, 2015.

Australian Patent Application No. 2014364942 Examination Report dated Dec. 10, 2016.

Canadian Patent Application No. 2,934,280 Office Action dated Dec. 30, 2016.

CA Patent Application No. 2,934,280 Office Action dated Feb. 1, 2019.

\* cited by examiner

LONG STRING PATTERN MATCHING OF AGGREGATED ACCOUNT DATA

CROSS-REFERENCE TO RELATED APPLICATIONS

This application claims the benefit of U.S. Provisional Patent Application No. 61/916,703, filed on Dec. 16, 2013, entitled LONG STRING PATTERN MATCHING OF AGGREGATED ACCOUNT DATA, which is hereby incorporated by reference in its entirety, including but not limited to those portions that specifically appear hereinafter, the incorporation by reference being made with the following exception: In the event that any portion of the above-referenced provisional patent application is inconsistent with this application, this application supersedes said above-referenced provisional application.

BACKGROUND

In modern financial institutions, data management and utilization is paramount for providing the best possible service to clients or customers while increasing the profitability of the financial institution. Such things as purchases, automatic payments and deposits, transfers and other repeated transactions have been facilitated by financial entities, payees, and employers for the convenience of all involved.

A benefit for financial service providers is that by facilitating such transactions they increase the number of services that they can provide to their customers. The increased interaction is created in part because setting up automatic transactions and discovering new transactions that can be done automatically is time consuming and difficult. Accordingly, many customers and patrons are deterred from change because of the difficulty in changing automatic services. Additionally, better financial institutions are deterred from attracting new customers, or providing new services, because many of the customers have existing automatic services with lesser service providers.

SUMMARY OF THE DISCLOSURE

The disclosure relates to a method and system to use indexable data strings that match on patterns and allow lookup of matches to take significantly less time and even avoid disk access with the addition of presence (bloom) filters to determine presence of a match in the dataset before referencing the index at all. This reduces the seek time for a unique pattern in a large dataset to at best O(1) and worst O(log(n)). This allows the matching of large datasets against other large datasets based on patterns and this can save a significant amount of processing time and needed hardware/software for discovering transaction data.

The disclosure also relates generally to automatic financial services and relates more particularly, but not necessarily entirely, to a computer system for gleaning transaction attributes from data for suggesting additional services with minimal user input.

The features and advantages of the disclosure will be set forth in the description which follows, and in part will be apparent from the description, or may be learned by the practice of the disclosure without undue experimentation. The features and advantages of the disclosure may be realized and obtained by means of computing systems, networks, and combinations of firmware, software and hardware, particularly disclosed and enumerated in the appended claims.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

The disclosure extends to methods, systems, and computer based products for discovering transaction attributes within a database of aggregated account data including, aggregating and matching financial account attributes between a plurality of accounts in order to provide additional services to account holders. In the following description of the disclosure, reference is made to the accompanying drawings, which form a part hereof, and in which is shown by way of illustration specific implementations in which the disclosure may be practiced. It is understood that other implementations may be utilized and structural changes may be made without departing from the scope of the disclosure.

Aggregated account data generally can provide historical transaction information once it is parsed through by a knowledgeable entity. Everyday transactions that are repeated provide opportunity and information for financial service providers, retailers and customers alike. Such transactions as regular payments (bill-pay) and deposits (direct deposit) are important services that financial institutions provide to their customers and may be automated, or suggested for automation, for the convenience of customers once discovered in the account data. For simplicity and clarity, the service of making bill payments will be primarily used in the embodiments of the disclosure, however, the advantages and features disclosed herein also apply equally to any repeatable transaction or identifiable transaction from within aggregated data. Such services are so important in fact that customers will often select a financial institution and stay with a financial institution due to the automated services like bill-pay over many other factors. A common problem related to suggesting and providing additional services, such as to customers, is that the current transactions of interest may be with data that is stored by third parties and must aggregated before it can be used. Additionally once the data has been aggregated, this large amount of data must be made usable. Accordingly, systems and methods will be disclosed herein for automating the process of identifying transaction from within large aggregation data stores.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, "user" is intended to denote a person or entity that is utilizing the methods and the systems disclosed herein.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

An implementation of methods for providing additional services may comprise processes that: determine signature for transactions types and generate unique identifier for signatures; create index of unique identifiers; apply bloom filter; substitute signatures for transaction data; compare to index of unique identifiers; generate recognized patterns for transactions; present patterns and transactions to crowd sourcing; receive corrections from crowd sourcing; implement corrections into index of unique identifiers; suggest services based on patterns of transactions; and recording the above in computer memory used in the above processes.

An embodiment of a system for suggesting additional financial services to an account holder based on the account holder's previous transactions may comprise:

an aggregation database within computer storage wherein the aggregation database is accessible over a computer network and wherein the aggregation database comprises aggregated account data comprising transactional data;

an aggregation engine for providing instruction to computer hardware for performing processes that aggregate data to the aggregation database;

a matching engine for providing operational instructions to computer hardware for matching strings of data representing transactions from within the aggregated data;

a transaction marker database comprising strings of data that are markers that have been determined to represent transactions, wherein the markers are stored in the transaction marker database for use by the matching engine; and a service suggestion engine for providing suggested services based on transactions identified using the transaction marker database and the matching engine.

An implementation of a method for suggesting service based on previous transactions to a customer may comprise:

aggregating account data using an aggregation engine that instructs computer hardware in performing processes that aggregate data to an aggregation database within computer storage wherein the aggregation database is accessible over a computer network and wherein the aggregation database comprises aggregated account data comprising transactional data;

matching strings of data using a matching engine that provides operational instructions to computer hardware for matching strings of data representing transactions from within the aggregated data;

determining transaction markers within the aggregated data and storing the markers in a transaction marker database comprising strings of data that are markers that have been determined to represent transactions, wherein the markers are stored in the transaction marker database for use by the matching engine; and suggesting services based on the strings of data representing transactions using a service suggestion engine that provides suggested services based on transactions identified using the transaction marker database and the matching engine.

Figure 1:
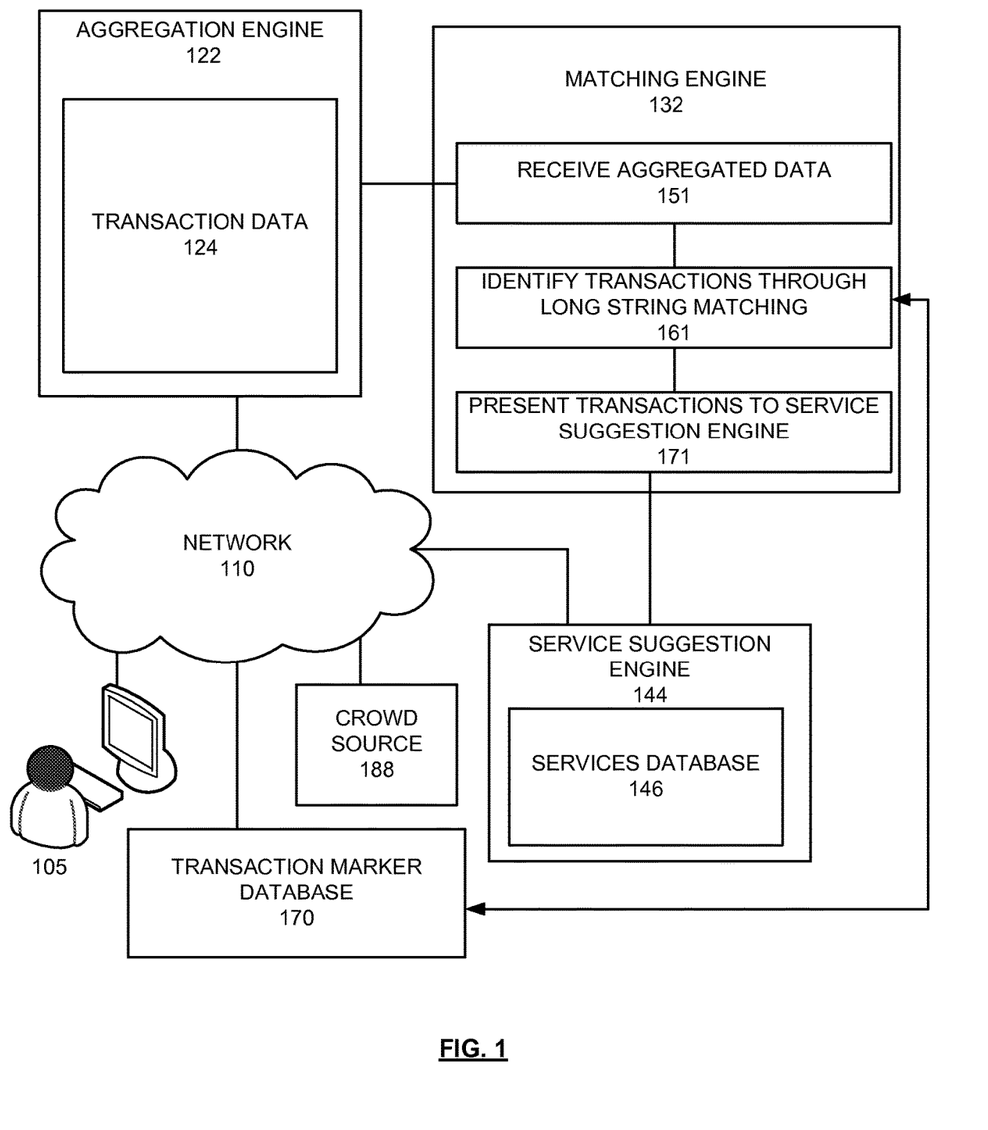
FIG. 1 illustrates a computer environment and network for identifying transaction within aggregated data in accordance with the principles and teachings of the disclosure.

FIG. 1 illustrates a computer environment and network for providing transaction identification from aggregated account data and services suggestions to a client. Illustrated in the figure is a user 105 that is electronically connected to financial institutions through a network 110. The financial institutions may comprise an aggregation engine 122 utilizing a server comprising transaction data 124. The system may further comprise a matching engine 132 utilizing computer hardware comprising received aggregated data, identified transaction data 161, and may further transmit the transactions for service suggestions.

As illustrated in the figure, the matching engine may perform the methods of receiving aggregation data at 151 and identifying transactions through string matching at 161, and presenting the identified transactions to a service suggestion engine at 171. The methods may be enabled by computer readable instructions stored in the memory of the computing environment.

As further illustrated in the FIG. 1, the system may comprise a service suggestion engine 144 running on computer hardware over a network, wherein the service suggestion engine utilizes a services database 146 comprising services available from financial institutions. The system may further comprise a transaction marker database 170 wherein unique identifiers/keys are stored representing various known or expected transaction types for use in optimizing the system as it performs additional iterations during use. Additionally, as can be seen in the figure, crowd sourcing 188 may be used to verify the nature of the transactions identified by the method.

Figure 2:
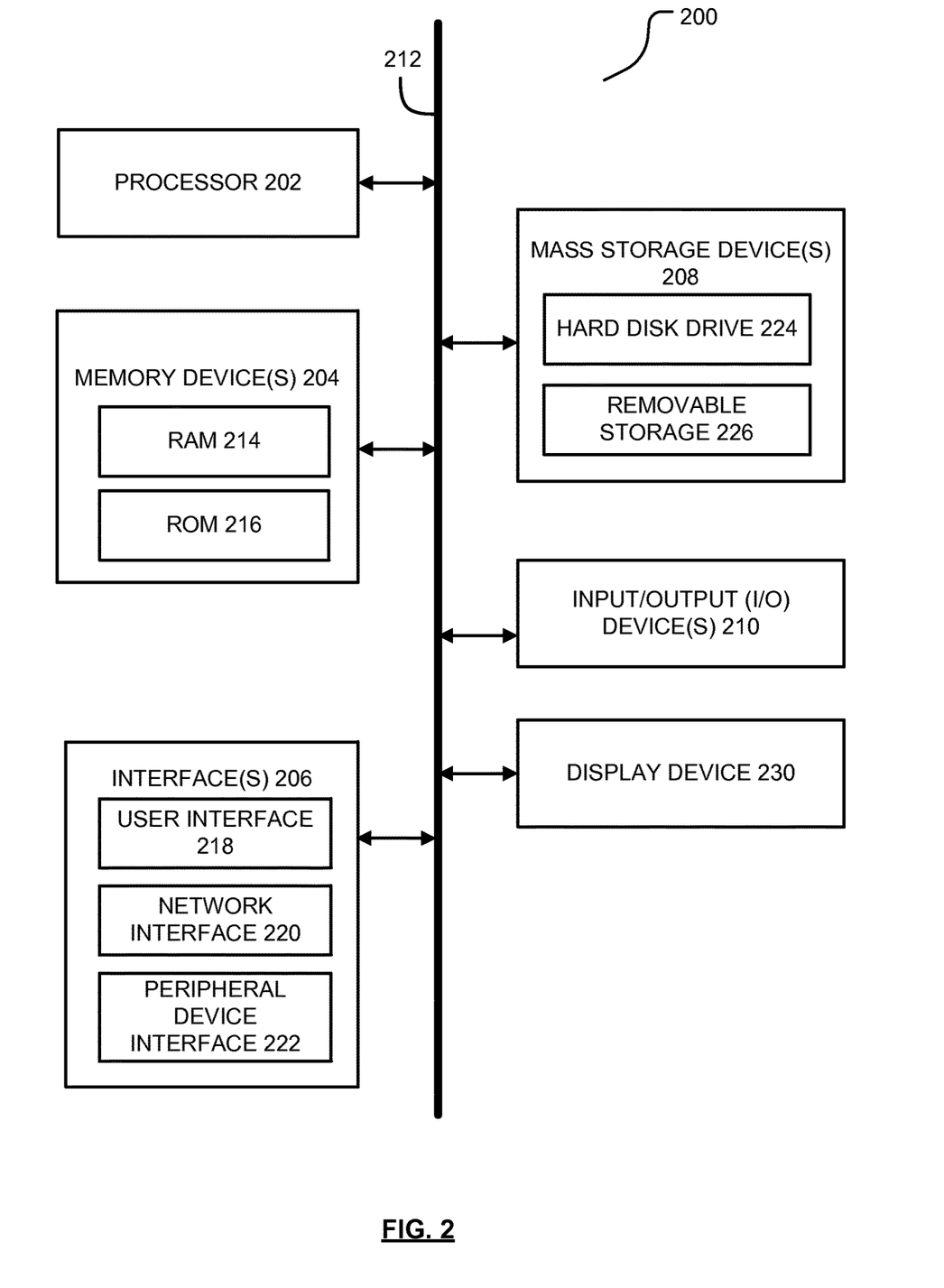
FIG. 2 illustrates a schematic representation of computer hardware and protocols that enable the various embodiments discussed herein in accordance with the principles and teachings of the disclosure.

Illustrated in FIG. 2 is a schematic representation of computer hardware and protocols that enable the various embodiments discussed herein. Implementations of the present disclosure may comprise or utilize a special purpose or general-purpose computer, including computer hardware, such as, for example, one or more processors and system memory, as discussed in greater detail below. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. In an implementation, a sensor and camera control unit may be networked in order to communicate with each other, and other components, connected over the network to which they are connected. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures that can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, control units, camera control units, hand-held devices, hand pieces, multi-processor systems, microprocessor-based or programmable consumer electronics, network PCs, minicomputers, mainframe computers, mobile telephones, PDAs, tablets, pagers, routers, switches, various storage devices, and the like. It should be noted that any of the above mentioned computing devices may be provided by or located within a brick and mortar location. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) or field programmable gate arrays (FPGAs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

Illustrated in the figure is a block diagram illustrating an example computing device 200. Computing device 200 may be used to perform various procedures, such as those discussed herein. Computing device 200 can function as a server, a client, or any other computing entity. Computing device 200 can perform various monitoring functions as discussed herein, and can execute one or more application programs, such as the application programs described herein. Computing device 200 can be any of a wide variety of computing devices, such as a desktop computer, a notebook computer, a server computer, a handheld computer, camera control unit, tablet computer and the like.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in the figure, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include digital imaging devices, electromagnetic sensors and emitters, cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 580 include a monitor, display terminal, video projection device, and the like.

Interface(s) 206 include various interfaces that allow computing device 200 to interact with other systems, devices, or computing environments. Example interface(s) 206 may include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) or field programmable gate arrays (FPGAs) can be programmed to carry out one or more of the systems and procedures described herein.

Figure 3:
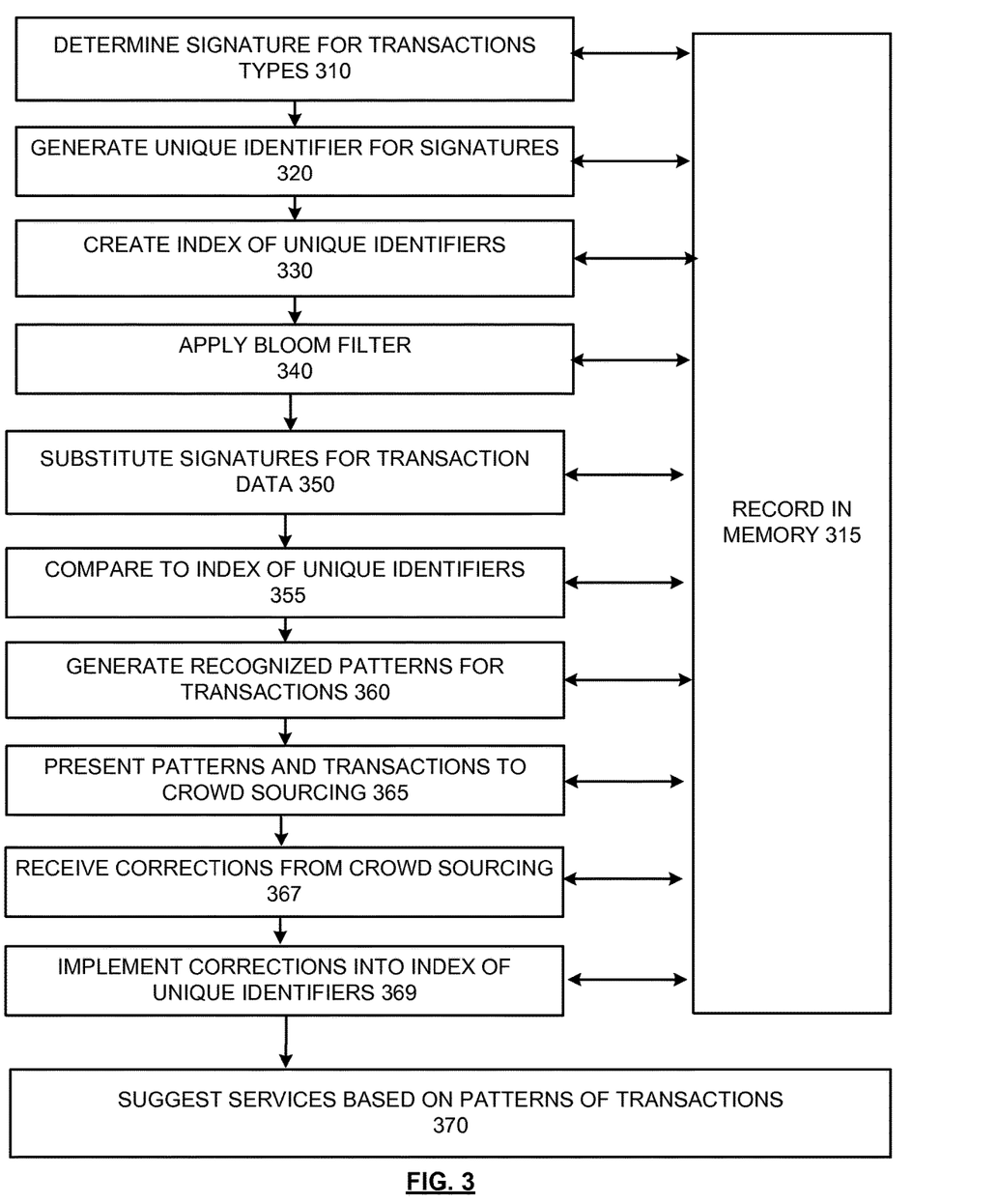
FIG. 3 illustrates a method for identifying transaction within aggregated data in accordance with the principles and teachings of the disclosure.

Illustrated in FIG. 3 is an implementation of a method for identifying transactions in aggregated account data. As can be seen in the figure, an implementation of methods for identifying transactions and providing additional services suggestions may comprise processes that: determine signatures for transaction types at 310 wherein strings of data may be identified and transformed into unique signatures that can then be used for categorization. It will be appreciated that a signature may be used to describe a category of the transaction or the transaction type. In an implementation, a signature may be used to recognize transactions types from within aggregated data comprising data relating to a plurality of transactions. In another implementation, a signature may be used for place holding when categorizing various transactions.

The method may then generate a unique identifier for signatures at 320 wherein the unique identifier may be a unique number or key that may be generated to create a finite deterministic qualifier for the majority of the signatures.

Additionally, an index of the unique identifiers may be created at 330. An index may comprise header metadata that may comprise the range of values contained within the index, and may additionally contain other identifying information that may be used within the system for optimization in parsing aggregated data.

An implementation may apply a bloom filter at 340 in order to preserve the efficiency of the system and prevent problematic queries from bogging down the system. Such queries may include transaction types that are not repetitious or may not fall within the intended index values, such that the bloom filter may read the index metadata and dismiss the query before searching and matching within the index.

Additionally, the system may comprise substituting the signatures for transaction data at 350 in order to reduce the amount of data processed and transmitted by the system. Such substitution may comprise hash functions for streamlining the data for mass processing in large aggregated databases. In an embodiment, the hash function may be predetermined based on collision expectations from hashing the transactions in the aggregated data.

The implementation may further comprise comparing transactions against the index of unique identifiers 355 and generating recognized patterns for transactions at 360. A simplified example of string matching and substitution is as follows:

Input string to match against dataset:
"APL*APPLE ITUNES STOR xxxxxxxx7753 CA 12/30"

The significant elements of the input string are the white space, number patterns, non-alphabetic characters (symbols), and alphabetic text. One derivation of the transformation of this string into a pattern is as follows:

replace all non-alpha/non-space/non-numeric characters with a space:
"APL APPLE iTUNES STOR xxxxxxxx7753 CA 12 30"

replace all repeating white-space with a single space:
"APL APPLE iTUNES STOR xxxxxxxx7753 CA 12 30"

replace all numerics with #:
"APL APPLE iTUNES STOR xxxxxxxx#### CA ## ##"

replace all repeating # which a single #:
"APL APPLE iTUNES STOR xxxxxxxx# CA # #"

standardize the capitalization (uppercase or lowercase):
"APL APPLE ITUNES STOR xxxxxxxx# CA # #"

This pattern is now able to be used in a unique index using known patterns for unique index matching and sorting/searching. The standardized transformation into a pattern based string allows a unique index to match a "fuzzy" pattern without having to calculate the "distance" or "fuzzy match" quotient as the pattern derived from a new input string must match exactly to be considered a match.

This method may be used in combination with presence (bloom) filters to allow a pattern's presence to be determined before referencing the index thus avoiding having to read the index off of disc.

The system may next present the patterns and transactions to crowd sourcing 365 for review and correction. In an implementation, a threshold may be predetermined for sending data for crowd sourcing. For example, a threshold of 88% accuracy may be determined to be acceptable for recognizing and categorizing, such that the system would not require the use of crowd sourcing.

In the implementation, the system may receive corrections from crowd sourcing at 367 and implement the correction within the transaction data. Additionally, the crowd source correction may be implemented into index of unique identifiers at 369 for greater optimization. Once the transactions have been identified, the system may suggest services based on the patterns of transactions at 370 and may present the suggestions to a user. It should be noted that the system may record the generated and newly discovered signatures as well as the resulting or processed data mentioned in each of the processes above in computer memory at 315.

Figure 4:
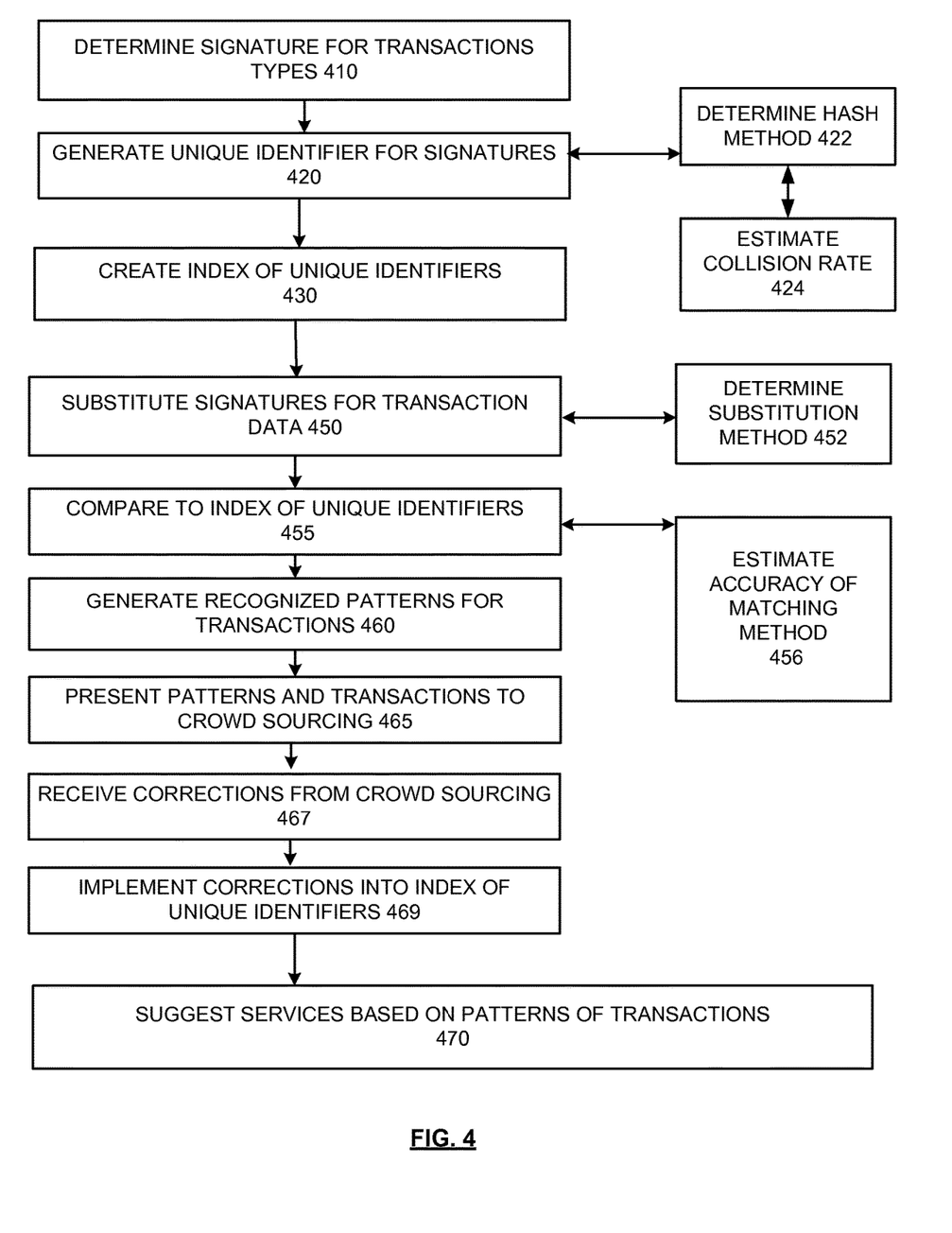
FIG. 4 illustrates a method for identifying transaction within aggregated data in accordance with the principles and teachings of the disclosure.

Illustrated in FIG. 4 is an implementation of a method for identifying transactions in aggregated account data. As can be seen in the figure, an implementation of methods for identifying transactions and providing additional service suggestions using hash and string matching algorithms is illustrated and may comprise processes to: determine signatures for transaction types at 410 wherein strings of data may be identified into unique signatures that can them be used for categorization. The method may then generate a unique identifier for signatures at 420, wherein the unique identifier may be a unique number or key that may be generated to create a finite deterministic qualifier for the majority of the signatures. Such signatures may be generated by hash functions at 422 for streamlining the data for mass processing in large aggregated databases. In an embodiment, the hash function may be predetermined based on collision estimations at 424 from hashing the transactions in the aggregated data.

Additionally, an index of the unique identifiers may be created at 430. An index may comprise header metadata the may comprise the range of values contained within the index, and may additionally contain other identifying information that may be used within the system for optimization in parsing aggregated data.

An implementation may apply a bloom filter 440 in order to preserve the efficiency of the system and prevent problematic queries from bogging down the system. Such queries may include transaction types that are not repetitious or may not fall within the intended index values, such that the bloom filter may read the index metadata and dismiss the query before searching and matching within the index.

Additionally, the system may comprise substituting the signatures for transaction data at 450 in order to reduce the amount of data processed and transmitted by the system. The substitution method may be predetermined at 452. Various substitution methods may be used that currently exist at the time of the disclosure, while future substitution methods yet to be developed are intended to fall within the scope of this disclosure.

The implementation may further comprise comparing transactions against the index of unique identifiers 455 and generate recognized patterns for transactions at 460. The comparisons may be facilitated by various string matching algorithms, such as the Levenshtein method and the like. The string matching algorithm may be determined at the outset or may be derived from an estimated accuracy at 456. Examples of known string matching processes are: Aho-Corasick string matching algorithm, Apostolico-Giancarlo algorithm, Bitap algorithm, Boyer-Moore string search algorithm, Boyer-Moore-Horspool algorithm, Commentz-Walter algorithm, Knuth-Morris-Pratt algorithm, Levenshtein automaton, Rabin-Karp algorithm, Raita Algorithm, and Zhu-Takaoka string matching algorithm.

Significant string fuzzy pattern matching methods may be used, such as for example, regular expressions and dynamic programming (Levenshtein), each of these can be optimized to be very fast, but still may require too much time and computational complexity overhead. This is because in the case of regular expressions that run fastest may still require that all words in a dataset to be compared against the regular expression pattern, and at the same time require tracking of the current state of the regular expression while testing each input character. With dynamic string matching, each potential distance measure is determined at runtime and the entire dataset must be compared against the input string. The previously mentioned pattern matching mechanisms can be very effective, but the buildup in computational complexity (time Big O) makes the comparison of large dataset impractical on a system, which should have guaranteed response time for matching long strings against large datasets.

The system may then present the patterns and transactions to crowd sourcing 465 for review and correction. In an implementation, a threshold may be predetermined for sending data for crowd sourcing. For example, a threshold of 88% accuracy may be determined to be acceptable for recognizing and categorizing such that the system would not require the use of crowd sourcing.

In the implementation, the system may receive corrections from crowd sourcing at 467 and implement the correction within the transaction data. Additionally, the crowd source correction may be implemented into index of unique identifiers at 469 for greater optimization. Once the transactions have been identified, the system may suggest services based on the patterns of transactions at 470 and may present the suggestions to a user. It should be noted that the system may record the generated and newly discovered signatures as well as the resulting or processed data mentioned in each of the processes above in computer memory.

Figure 5:
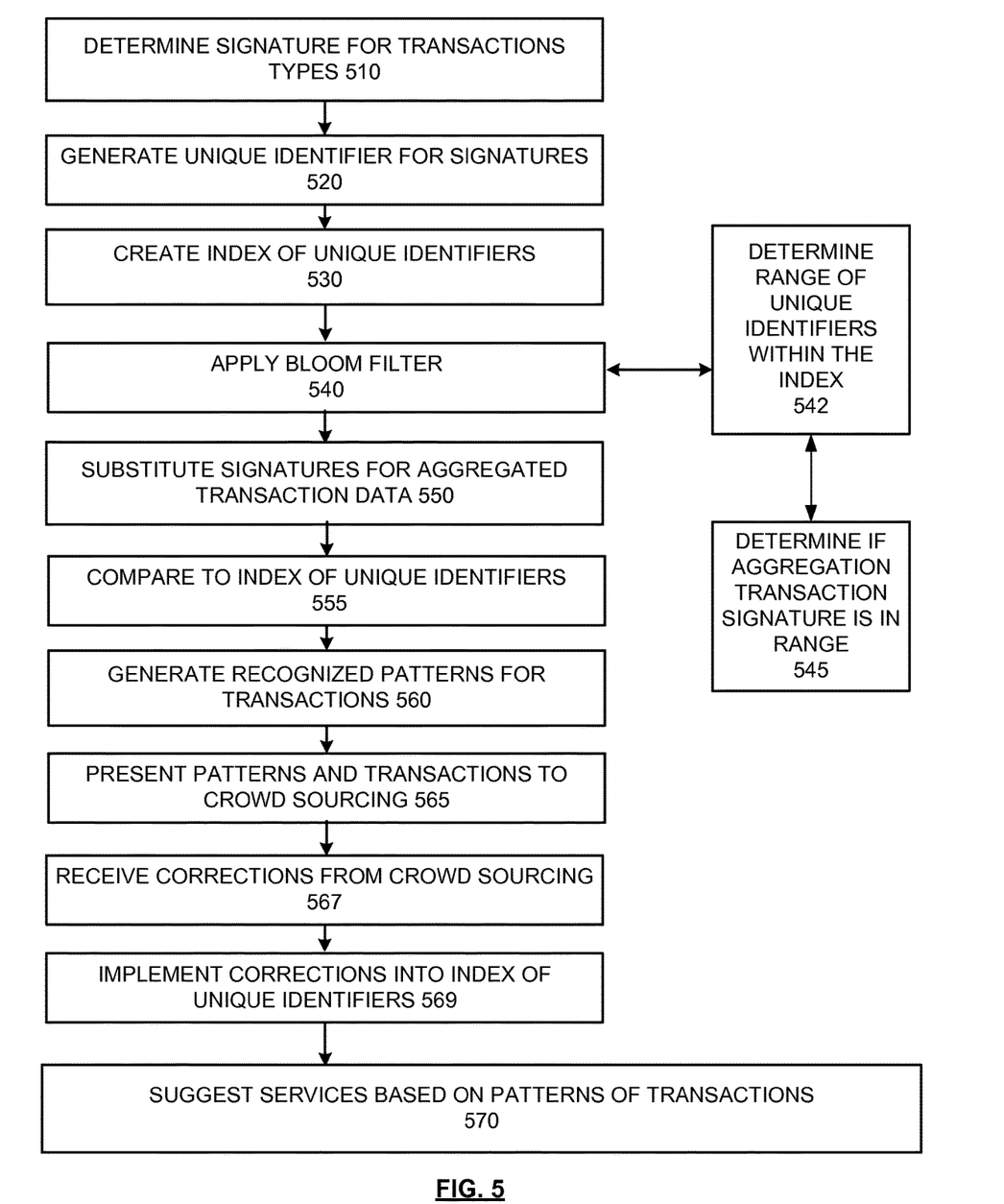
FIG. 5 illustrates a method for identifying transaction within aggregated data in accordance with the principles and teachings of the disclosure.

Illustrated in FIG. 5 is an implementation of a method for identifying transactions in aggregated account data wherein a bloom filter is applied during use. As can be seen in the figure, an implementation of methods for identifying transactions and providing additional services suggestions using hash and string matching algorithms is illustrated and may comprise processes to: determine signatures for transaction types at 510 wherein strings of data may be identified into unique signatures that can them be used for categorization. The method may then generate a unique identifier for signatures at 520 wherein the unique identifier may be a unique number or key that may be generated to create a finite deterministic qualifier for the majority of the signatures. Such signatures may be generated by hash functions for streamlining the data for mass processing in large aggregated databases. In an embodiment, the hash function may be predetermined based on collision estimations from hashing the transactions in the aggregated data.

Additionally, an index of the unique identifiers may be created at 530. An index may comprise header metadata the may comprise the range of values contained within the index, and may additionally contain other identifying information that may be used within the system for optimization in parsing aggregated data. In an implementation the unique identifier may be a hash code of the signature wherein the hash characters are place holders for specific transaction string data.

Additionally, in an implementation thresholds for matching may be determined by available memory for use by the matching engine.

An implementation may apply a bloom filter 540 in order to preserve the efficiency of the system and prevent problematic queries from bogging down the system. Such queries may include transaction types that are not repetitious or may not fall within the intended index values, such that the bloom filter may read the index metadata at 542 and dismiss the query before searching and matching within the index if it is not in range at 545.

Additionally, the system may comprise substituting the signatures for transaction data at 550 in order to reduce the amount of data processed and transmitted by the system. The implementation may further comprise comparing transactions against the index of unique identifiers 555 and generate recognized patterns for transactions at 560.

The system may then present the patterns and transactions to crowd sourcing 565 for review and correction. In an implementation, a threshold may be predetermined for sending data for crowd sourcing. For example, a threshold of 88% accuracy may be determined to be acceptable for recognizing and categorizing such that the system would not require the use of crowd sourcing.

In the implementation, the system may receive corrections from crowd sourcing at 567 and implement the correction within the transaction data. Additionally, the crowd source correction may be implemented into index of unique identifiers at 569 for greater optimization. Once the transactions have been identified, the system may suggest services based on the patterns of transactions at 570 and may present the suggestions to a user. It should be noted that the system may record the generated and newly discovered signatures as well as the resulting or processed data mentioned in each of the processes above in computer memory.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method for long string pattern matching of account data, the method comprising:
   aggregating, by a computing device, financial account data that is received from a plurality of different third party servers, the aggregated financial account data comprising historical transaction data for a plurality of financial transactions;
   generating a transaction signature for each of the transactions in the transaction data by transforming strings representing each of the plurality of financial transactions in the transaction data into a unique signature and used to recognize transaction types from within the transaction data:
   determining, by the computing device, the generated transaction signature for each of the transactions in the transaction data representing the plurality of financial transactions;
   storing, by the computing device, the determined transaction signature for each of the multiple first strings of the transaction data in a transaction signature database;
   generating, by the computing device, unique identifiers for each transaction signature by applying a hash function to each transaction signature, the hash function predetermined based on collision estimations from hashing the transaction data in the aggregated financial account data;
   storing, by the computing device, each unique identifier of the multiple first strings of the transaction data in an index on a disk, the disk being nonvolatile computer-readable media, each unique identifier in the index corresponding to a transaction signature in the transaction signature database;
   storing, by the computing device, metadata corresponding to the index in memory, the metadata comprising a range of values of the first strings of transaction data contained within the index, the memory being volatile computer-readable media that is configured to have a seek time that is faster than a seek time of the non-volatile computer-readable media;
   identifying, by the computing device, a second string of transaction data;
   applying, by the computing device, a bloom filter to the metadata that is stored in the memory using a hash of the second string of transaction data to determine whether the second string of transaction data can be dismissed as not matching any of the first strings of transaction data using only the metadata stored in the memory prior to searching the index on the disk for the second string of transaction data;
   in response to determining that the second string of transaction data cannot be dismissed as not matching any of the first strings of transaction data using only the metadata stored in the memory, performing, by the computing device, long string pattern matching to determine whether the second string of transaction data matches any of the first strings of transaction data in the transaction signature database using the index stored on the disk;
   in response to determining that the second string of transaction data matches a particular one of the first strings of transaction data in the transaction signature database, assigning, by the computing device, a transaction signature of the particular one of the first strings of transaction data to the second string of transaction data;
   identifying, by the computing device, a third string of transaction data;
   applying, by the computing device, the bloom filter to the metadata stored in the memory using a hash of the third string of transaction data to determine whether the third string of transaction data can be dismissed as not matching any of the first strings of transaction data using only the metadata stored in the memory prior to searching the index on the disk for the second string of transaction data; and
   in response to determining that the third string of transaction data can be dismissed as not matching any of the first strings of transaction data using only the metadata stored in the memory, dismissing, by the computing device, the third string of transaction data as not matching any of the first strings of transaction data using only the metadata stored in the memory and without accessing the index stored on the disk.

2. The method of claim 1, wherein:
   the metadata includes a range of values of the first strings of transaction data contained within the index; and
   the bloom filter is employed to dismiss the third string of transaction data where the second string of transaction data has a value that is not in the range of values.

3. The method of claim 1, wherein the identifying of the second string of transaction data and the identifying of the third string of transaction data are performed by aggregating the second string of transaction data and the third string of transaction data from data stored by a third party.

4. The method of claim 1, further comprising generating, by the computing device, a pattern for the third string of transaction data.

5. The method of claim 4, wherein the generating of the pattern for the third string of transaction data includes replacing all non-alpha, non-space, and non-numeric characters in the third string of transaction data with a space character.

6. The method of claim 5, wherein the generating of the pattern for the third string of transaction data further includes replacing all sequential repeats of space characters in the third string of transaction data with a single space character.

7. The method of claim 6, wherein the generating of the pattern for the third string of transaction data further includes replacing numeric characters in the third string of transaction data with a particular character that is a non-alpha, non-space, and non-numeric character.

8. The method of claim 7, wherein the generating of the pattern for the third string of transaction data further includes replacing all sequential repeats of the particular character in the third string of transaction data with a single one of the particular character.

9. The method of claim 8, wherein the generating of the pattern for the third string of transaction data further includes standardizing capitalization of alpha characters in the third string of transaction data to either all uppercase or all lowercase characters.

10. The method of claim 4, further comprising:
in response to determining that the third string of transaction data can be dismissed as not matching any of the first strings of transaction data using only the metadata stored in the memory, presenting, by the computing device, the third string of transaction data and the generated pattern for the third string of transaction data to crowd sourcing in order to assign a transaction signature to the third string of transaction data.

11. The method of claim 10, further comprising:
suggesting, by the computing device, services to a user corresponding to the second string of transaction data based on the transaction signature assigned to the second string of transaction data and based on the transaction signature assigned to the third string of transaction data.

12. An apparatus for long string pattern matching of account data, the apparatus comprising:
a disk;
a memory;
means for aggregating financial account data that is received from a plurality of different third parties, the aggregated financial account data comprising historical transaction data for a plurality of financial transactions;
means for generating a transaction signature for each of the transactions in the transaction data by transforming strings representing each of the plurality of financial transactions in the transaction data into a unique signature and used to recognize transaction types from within the transaction data;
means for determining the generated transaction signature for each of the transactions in the transaction data representing the plurality of financial transactions;
means for storing the determined transaction signature for each of the multiple first strings of the transaction data in a transaction signature database;
means for generating unique identifiers for each transaction signature by applying a hash function to each transaction signature, the hash function predetermined based on collision estimations from hashing the transaction data in the aggregated financial account data;
means for storing each unique identifier of the multiple first strings of the transaction data in an index on a disk, the disk being nonvolatile computer-readable media, each unique identifier in the index corresponding to a transaction signature in the transaction signature database;
means for storing metadata corresponding to the index in memory, the metadata comprising a range of values of the first strings of transaction data contained within the index, the memory being volatile computer-readable media that is configured to have a seek time that is faster than a seek time of the nonvolatile computer-readable media;
means for identifying a second string of transaction data;
means for applying a bloom filter to the metadata that is stored in the memory using a hash of the second string of transaction data to determine whether the second string of transaction data can be dismissed as not matching any of the first strings of transaction data using only the metadata stored in the memory prior to searching the index on the disk for the second string of transaction data;
means for, in response to determining that the second string of transaction data cannot be dismissed as not matching any of the first strings of transaction data using only the metadata stored in the memory, performing long string pattern matching to determine whether the second string of transaction data matches any of the first strings of transaction data in the transaction signature database using the index stored on the disk;
means for, in response to determining that the second string of transaction data matches a particular one of the first strings of transaction data in the transaction signature database, assigning a transaction signature of the particular one of the first strings of transaction data to the second string of transaction data;
means for identifying a third string of transaction data;
means for applying the bloom filter to the metadata stored in the memory using a hash of the third string of transaction data to determine whether the third string of transaction data can be dismissed as not matching any of the first strings of transaction data using only the metadata stored in the memory prior to searching the index on the disk for the second string of transaction data; and
means for, in response to determining that the third string of transaction data can be dismissed as not matching any of the first strings of transaction data using only the metadata stored in the memory, dismissing the third string of transaction data as not matching any of the first strings of transaction data using only the metadata stored in the memory and without accessing the index stored on the disk.

13. The apparatus of claim 12, wherein:
the metadata includes a range of values of the first strings of transaction data contained within the index; and
the bloom filter is employed to dismiss the third string of transaction data where the second string of transaction data has a value that is not in the range of values.

14. The apparatus of claim 12, wherein identifying the second string of transaction data and identifying the third string of transaction data are performed by aggregating the second string of transaction data and the third string of transaction data from data stored by a third party.

15. The apparatus of claim 12, further comprising means for generating a pattern for the third string of transaction data.

16. The apparatus of claim 15, wherein generating the pattern for the third string of transaction data includes replacing all non-alpha, non-space, and non-numeric characters in the third string of transaction data with a space character.

17. The apparatus of claim 16, wherein generating the pattern for the third string of transaction data further includes replacing all sequential repeats of space characters in the third string of transaction data with a single space character.

18. The apparatus of claim 17, wherein generating the pattern for the third string of transaction data further includes replacing numeric characters in the third string of transaction data with a particular character that is a non-alpha, non-space, and non-numeric character.

19. The apparatus of claim 18, wherein generating the pattern for the third string of transaction data further includes replacing all sequential repeats of the particular character in the third string of transaction data with a single one of the particular character.

20. The apparatus of claim 19, wherein generating the pattern for the third string of transaction data further includes standardizing capitalization of alpha characters in the third string of transaction data to either all uppercase or all lowercase characters.

21. The apparatus of claim 15, further comprising:
means for, in response to determining that the third string of transaction data can be dismissed as not matching any of the first strings of transaction data using only the metadata stored in the memory, presenting the third string of transaction data and the generated pattern for the third string of transaction data to crowd sourcing in order to assign a transaction signature to the third string of transaction data.

22. The apparatus of claim 21, further comprising:
means for suggesting services to a user corresponding to the second string of transaction data based on the transaction signature assigned to the second string of transaction data and based on the transaction signature assigned to the third string of transaction data.

23. The apparatus of claim 12, wherein the said means comprise one or more of logic hardware and a computer readable medium storing program code executable to perform functions associated with the said means.

* * * * *